(12) United States Patent
Hill (10) Patent No.: US 11,176,223 B1
(45) Date of Patent: Nov. 16, 2021

(54) PAGE RENDERING BY AN INTERMEDIARY SYSTEM THAT USES A TRUNCATED LIBRARY

(71) Applicant: Amazon Technologies, Inc., Seattle, WA (US)

(72) Inventor: Peter Frank Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 917 days.

(21) Appl. No.: 14/520,039

(22) Filed: Oct. 21, 2014

(51) Int. Cl.
*G06F 15/00* (2006.01)
*G06F 16/958* (2019.01)
*G06F 40/14* (2020.01)

(52) U.S. Cl.
CPC ........... *G06F 16/972* (2019.01); *G06F 40/14* (2020.01)

(58) Field of Classification Search
CPC .......... G06F 17/24; G06F 17/25; G06T 11/60; A63F 2300/5553; A63F 2300/6623
USPC ................. 715/201, 202, 230, 255
See application file for complete search history.

(56) References Cited

U.S. PATENT DOCUMENTS

| 2003/0025728 A1* | 2/2003 | Ebbo ................ G06F 17/30893 715/744 |
| 2012/0198279 A1* | 8/2012 | Schroeder ........... G06F 11/2294 714/32 |
| 2013/0031459 A1* | 1/2013 | Khorashadi ......... G06F 17/2247 715/234 |

\* cited by examiner

*Primary Examiner* — Kavita Stanley
*Assistant Examiner* — Jenq-Kang Chu
(74) *Attorney, Agent, or Firm* — Knobbe, Martens, Olson & Bear, LLP (57) ABSTRACT

An intermediary system identifies a portion of the library that is used to load a page, generates a hint file based on just the portion of the library that is used to load the page, and retrieves the hint file each time the page is loaded in the future. For example, the intermediary system may determine a portion of the library that is used to load the page when a page is first requested. Once the intermediary system determines the portion of the library that is used to load the page, the hint file is generated based on the portion. Each subsequent time that the intermediary system receives a request to load the same page, the intermediary system may retrieve the hint file to determine how to load the page.

19 Claims, 5 Drawing Sheets

PAGE RENDERING BY AN INTERMEDIARY SYSTEM THAT USES A TRUNCATED LIBRARY

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for the user.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

One method for reducing network page or content page load times is to offload some of the processing (including rendering) to an intermediary system (e.g., a proxy system) that sits logically between the user's computing device and a system that hosts the network page or content page. For example, instead of the user's device retrieving the page (e.g., web page) directly from the system that hosts the page, the intermediary system can retrieve and render the page, including loading any additional data (e.g., a library for a script, such as JavaScript, cascading style sheets (CSS), etc.) that is requested during or after the rendering process. As another example, the intermediary system can retrieve the code of the page (e.g., HTML, XHTML, XML, etc.) from the system that hosts the page, parse the code, retrieve script libraries as indicated by the parsed code, and transmit the parsed code and script libraries to the user's device so that the user's device can render and display the page.

However, even using the techniques described above, the page load times may be higher than desired. For example, the code of the page may include a script that, when executed, may instruct the intermediary system or the browser of the user's device to retrieve a library associated with the script. The library may include code that enables the functionality provided by the execution of the script code. Typically, execution of the script may not require all of the code in the library, yet the entire library is retrieved anyway. In some cases, the library is a small file (e.g., several KBs). In other cases, though, the library is a large file (e.g., several MBs). Large library files can be a problem because the intermediary system or the browser of the user's device may pause the compilation and execution of the remaining code of the page until the library is retrieved and the script is executed. Thus, retrieval of the library file can stall the page load, thereby negatively affecting the page load time.

Accordingly, the embodiments described herein present systems and methods for (1) identifying a portion of the library that is used to load a page, (2) generating a hint file that identifies a location of an alternative version of the library that includes just the portion of the library that is used to load the page or that includes compilation hints that can be used to compile the library in a more efficient or optimal manner, and (3) retrieving the hint file each time the page is loaded in the future. For example, the intermediary system may determine a portion of the library that is used to load the page. The intermediary system may determine this information when a user device requests the page for the first time. If the intermediary system is configured to transmit a rendered page to the user device, then the intermediary system may determine the portion of the library that is used to load the page while rendering the page. If the intermediary system is configured to transmit the parsed code to the user device for rendering, the intermediary system may determine the portion of the library that is used to load the page based on information provided by the user device.

Once the intermediary system determines the portion of the library that is used to load the page, the portion may be included in an alternate version of the library and a hint file that is stored in association with an identity of the page and the library from which the hint file is derived may reference a location of the alternate version of the library. For example, the hint file may be stored in a hint file database (locally or remotely) in an entry associated with the page and the library from which the hint file is derived. Alternatively, the hint file may include compilation hints that can be used to compile the library in a more efficient or optimal manner, where the compilation hints are based on the determined portions. Each subsequent time that the intermediary system receives a request to load the page, either from the user device or another user device, the intermediary system may retrieve and parse the code of the page as described above. However, if the intermediary system is instructed to retrieve a library (either via execution of the code to render the page or via a request from the user device), the intermediary system may check the hint file database to determine whether a hint file associated with the page and the library exists. If a hint file exists, the intermediary system may retrieve the hint file and use the information provided in the hint file to execute the script (if the intermediary system is rendering the page) or transmit the hint file to the user device (if the user device is rendering the page). The hint file may instruct the intermediary system or the user device to retrieve the alternate version of the library instead of the original library or may provide compilation hints for compiling the original library.

The techniques described herein may be used to generate one or more hint files for a plurality of libraries and/or a plurality of pages. In addition, a single hint file may reference a file that includes portions of code from different libraries or may include compilation hints for at least some portions of code from different libraries. Likewise, the intermediary system may generate multiple hint files for a single library and page.

In some cases, a portion of a library not included in the alternate version of the library referenced by the hint file or for which no compilation hints are included in the hint file may be needed to load a page. For example, the hint file may be based on a first user device that used a first feature. However, a second user device may attempt to use a second feature not used by the first user device, and thus the hint file may not reference a location of an alternate version of the library that includes the portion of the library used to enable the second feature or may not include compilation hints that reference the portion of the library used to enable the second feature. In such a situation, the intermediary system can retrieve the needed portion of the library or the entire library itself and either provide such data to the user device or render the page using the newly retrieved data.

If bandwidth is limited, the intermediary system can optimize the hint file and/or use multiple hint files for the same library and page. For example, a first hint file can reference a location of an alternate version of a library that includes the portion of the library associated with above the fold assets (e.g., the portion of the library used to enable features that will first appear in the user interface displaying the page before the user associated with the user device interacts with the page) or can include compilation hints that are based on the portion of the library associated with above the fold assets. The intermediary system may generate just the first hint file or may generate a second (and/or third, fourth, etc.) hint file that references a location of an alternate version of the library that includes the portion of the library associated with below the fold assets (e.g., the portion of the library used to enable features that will not appear in the user interface displaying the page before the user associated with the user device interacts with the page) or that includes compilation hints that are based on the portion of the library associated with below the fold assets. The intermediary system may transmit the first hint file and then any subsequent hint files based on bandwidth availability and/or whether the features below the fold are being accessed by the user.

As described above, the hint file can be based on a first request for a page; however, this is not meant to be limiting. In some embodiments, the hint file is based on a plurality of requests for the page. For example, multiple user devices may request the same page. The intermediary server may monitor the behavior of each user device and determine the portions of a library used by each user device. In some cases, the user devices may use different parts of a library. Thus, the intermediary system can generate a hint file by aggregating the information obtained from the plurality of requests for the page (e.g., the hint file can reference a location of an alternate version of the library that includes all portions of the library that are used by at least one user device or can include compilation hints for all portions of the library that are used by at least one user device, the hint file can reference a location of an alternate version of the library that includes the portions of the library that are used most often by the user devices or can include compilation hints that reference the portions of the library that are used most often by the user devices, the hint file can reference a location of an alternate version of the library that includes the portions of the library that are used by each user device or can include compilation hints that reference the portions of the library that are used by each user device, etc.).

In further embodiments, a hint file can be associated with groups of user devices along with the library and page. For example, a group of user devices may have a certain software and/or hardware configuration. The hint files can be optimized for different combinations of software and/or hardware configurations. Thus, the intermediary system may retrieve a hint file if a hint file exists that is associated with the same or similar (e.g., compatible) software and/or hardware configuration as the user device that requested the page. In addition, the intermediary system can determine whether to perform script compilation and/or render the page or whether script compilation and/or page rendering should occur on the user device based on the software and/or hardware configuration of the user device. For example, if the user device has a CPU at a first speed, the intermediary system may perform the compilation and rendering, whereas if the user device has a CPU at a second speed that is faster than the first speed, then the user device may be directed to perform the compilation and rendering. Other factors that may determine which device performs the operations may include memory size, content retrieval speeds (e.g., the longer it takes the user device to retrieve content, the more likely the intermediary system will perform the rendering, etc.), and/or the like.

In further embodiments, a hint file can be associated with individual user devices along with the library and the page. For example, users of different user devices may access the same page differently. One user may only access the functionality associated with one script, a second user may access the functionality associated with all scripts, and a third user may not access any functionality associated with scripts. Thus, the hint file can be tailored to individual user devices and include a reference to a location of an alternate version of a library that includes the portions of the library used by the respective user device or include compilation hints directed to the portions of the library used by the respective user device. As another example, a page may include functionality provided by multiple libraries or multiple features that use different portions of a library, and a user may access the functionality on the page in a certain order each time the page is requested. If bandwidth is an issue, the hint file can include a reference to a location of an alternate version of a library that includes the code for the libraries or the portions of the library that are expected to be accessed first or can include compilation hints directed to the code for the libraries or the portions of the library that are expected to be accessed first.

In some embodiments, the hint files can become stale after a period of time. For example, a hint file may be valid for a period of time. After the validity period expires, the hint file can be removed from the hint file database, causing the original library to be retrieved when a request for the page associated with the removed hint file is made. A new hint file may then be generated based on the new request for the page. Setting a validity period may ensure that the data included in the hint file does not become stale as pages are updated and/or user behavior changes.

The use of a hint file instead of an entire library to render pages may provide several benefits. While some conventional systems may truncate libraries by stripping developer comments, the conventional systems do not truncate libraries by stripping a portion of the executable content as described herein. Generally, the executable content of the library comprises a larger portion of the library than the developer comments, and thus the techniques described herein may achieve reductions in file size not attained by conventional systems. Because the library files referenced by the hint file may have a size that is smaller than the original library file size, the time to load a page may be reduced. In addition, the user device may consume less bandwidth in retrieving data from the intermediary system given the difference in file sizes. Furthermore, given the difference in file size between the library file referenced by the hint file and the original library file, the user device may be able to reduce the amount of computing resources that are dedicated to processing the data and loading the page. The reduction in the amount of computing resources consumed may reduce battery usage and free the CPU to process other data executing on the user device. The reduction in the amount of computing resources may also improve the user experience as the user device may be more responsive and act in a more fluid manner.

While the disclosure is described herein with reference to using hint files when script libraries are requested, this is not meant to be limiting. The techniques described herein to use hint files can be applied in any application that executes code to generate an executed result and can be used when any type of library or file that includes a large amount of unused code is requested (e.g., a support library for a language such as JAVA, Hypertext Preprocessor (PHP), SQL, Python, Ruby, etc.). For example, the techniques can be used by a server that hosts applications that can be accessed by various user devices (e.g., the server can determine what portions of a library are used and generate hint files based on the determination). The techniques described herein to use hint files can also apply to any code, not just scripts (e.g., JAVA, PHP, SQL, Python, Ruby, etc.).

System Components

Figure 1:
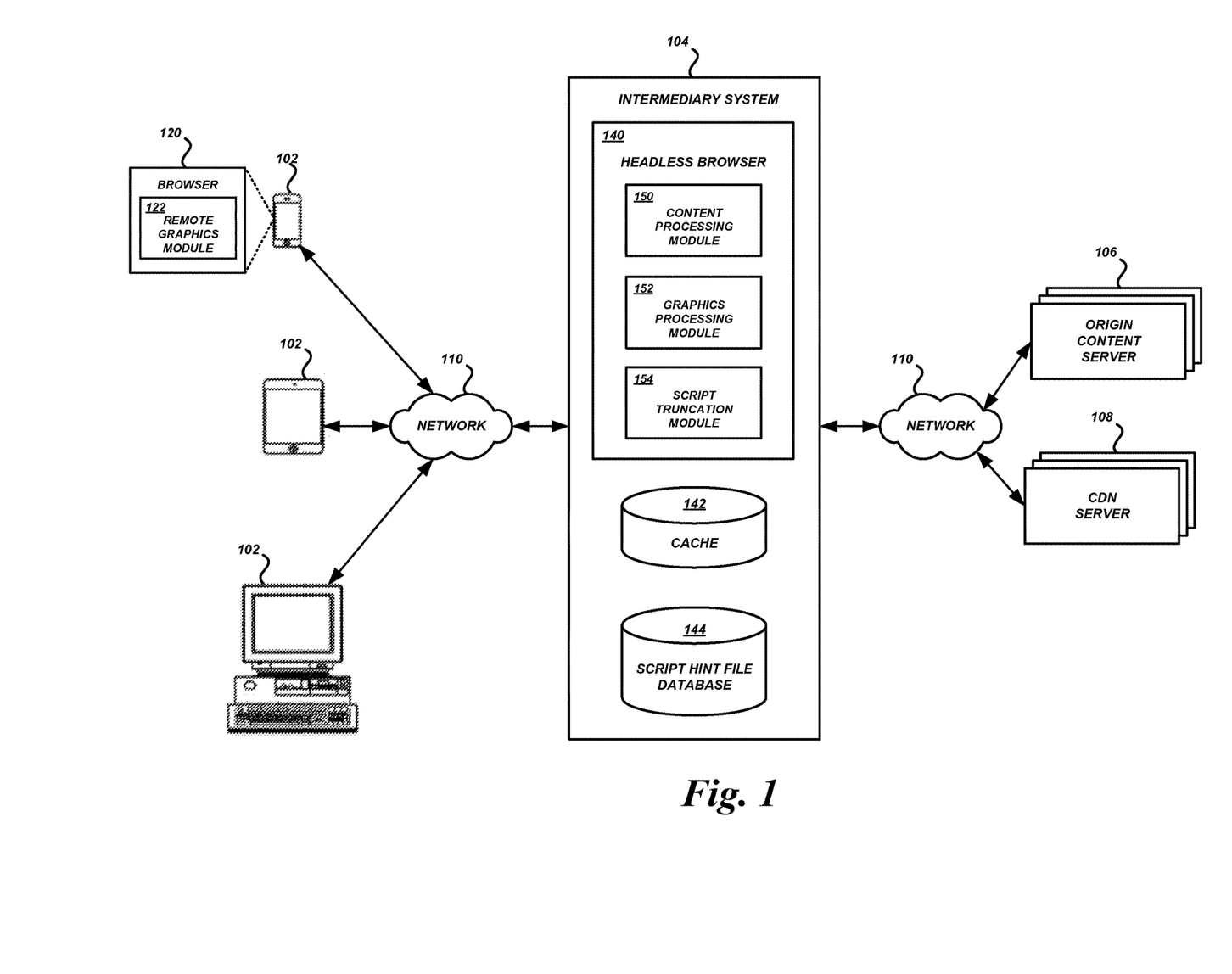
FIG. 1 illustrates a script library truncation environment with an intermediary system that processes content and truncates script libraries according to one embodiment.

FIG. 1 illustrates a script library truncation environment with an intermediary system that processes content and truncates script libraries according to one embodiment. The script library truncation environment shown in FIG. 1 includes various user devices 102, an intermediary system 104, and various content sources, including origin content servers 106 and content delivery network ("CDN") servers 108. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the script library truncation environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated display commands, such as those generated by the intermediary system 104. The remote graphics module 122 (or some other module of the browser application 120) can execute the remote-generated display commands to display a representation of the requested content on the user device 102. Advantageously, the remote graphics module 122 may facilitate the display of graphical representations of requested content at the user device 102 without requiring the user device 102 to receive content files (e.g., HTML files, JPEG images, etc.) directly or indirectly from content sources 106 and 108. However, in some instances as described herein, the user device 102 may receive some content files (e.g., HTML files, script libraries, hint files, etc.) to increase efficiency.

In some embodiments, the browser application 120 may be a conventional web browser that is not specifically designed or configured to execute remotely-generated graphics commands and other display commands. For example, the browser application 120 may use or otherwise be associated with a remote graphics module 122 that is not integrated with the browser application 120, such as a browser add-in or extension. In some embodiments, applications other than a browser application 120 may include or use a remote graphics module 122 (or some similar module) to execute graphics commands generated by an intermediary system 104. For example, content aggregators or other specialized content display applications for mobile devices (e.g., Flipboard) may utilize a remote graphics module 122.

The intermediary system 104 can be a computing system configured to retrieve content on behalf of user devices 102 and generate display commands for execution by the user devices 102. The intermediary system 104 can also be adapted to identify a portion of a script library that is used to load a content page, generate a truncated script library that includes just the portion of the script library that is used to load the content page, generate a hint file that references a location of the truncated script library or that includes compilation hints (based on the portion of the script library that is used to load the content page) that can be used to compile the original script library in a more efficient or optimal manner, and/or retrieve the hint file each time the content page is requested in the future. If the hint file references the location of the truncated script library, then the intermediary system 104 may retrieve the truncated script library in place of the original script library. Otherwise, the intermediary system 104 may retrieve and compile the original script library accordingly to the compilation hints in the hint file. For example, the intermediary system 104 can be a physical server or group of physical servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide the content retrieval and processing functionality and/or the hint file generation functionality described herein. For example, the intermediary system 104 may include a server-based browser application or some other content rendering application to process content retrieved from content sources. Such a content rendering application may be referred to as a "headless browser" 140. A headless browser 140 does not (or is not required to) cause display of content by a graphical display device of the server that on which the headless browser 140 is executing. Instead, the headless browser 140 provides display commands to separate user devices 102. Illustratively, the headless browser 140 may obtain requested content from an origin content server 106 and/or CDN server 108, obtain additional items (e.g., images, executable code files, such as script libraries, hint files, etc.) referenced by the requested content, execute code (e.g., JavaScript, CSS, etc.) that may be included in or referenced by the content, generate graphics commands to display a graphical representation of the content, and/or transmit the graphics commands to the user device 102. Furthermore, in some cases, the headless browser 140 may determine a portion of a script library, if any, that is referenced to display the graphical representation of the content, generate a truncated script library that includes just the portion of the script library that is referenced, and/or generate a hint file that references a location of the truncated script library or that includes compilation hints based on the portion of the script library that is referenced. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability. Although the headless browser 140 does not typically cause the display of content by a graphical display device of the server, in some embodiments, it may. For example, in some cases, a copy of content provided to a user device 102 for display may also be displayed on the graphical display device of the intermediary system 104.

The headless browser 140 may include various modules to provide the functionality described above and in greater detail below. For example, the headless browser 140 may include a content processing module 150, a graphics processing module 152, and a script truncation module 154. In some embodiments, the headless browser 140 may include additional or fewer modules than those shown in FIG. 1. The content processing module 150 may include any system that can retrieve and parse content files associated with a content page (e.g., the code of the page, such as HTML, XHTML, XML, JavaScript, CSS, etc.) and generate a DOM representation of the content (e.g., a DOM tree). For example, each node of the DOM tree may represent an element to be displayed in the content page (e.g., a tag, such as an HTML tag, that indicates tables, links, images, videos, etc.). The content page can eventually be rendered (e.g., by the graphics processing module 152 or the browser application 120) based on a traversal of the DOM tree. In some embodiments, the content processing module 150 further determines how to divide a page into a set of tiles to be provided to the browser application 120 and/or the remote graphics module 122.

The graphics processing module 152 may include any system that can receive the DOM representation and generate display commands (e.g., SKIA commands) to render a graphical representation of the content at a user device 102. The graphics processing module 152 may provide the display commands to the user device 102. In further embodiments, if the content processing module 150 determines how to divide a page into a set of tiles, the graphics processing module 152 receives definitions or metadata for each tile from the set of tiles determined by the content processing module 150. The graphics processing module 152 may use the tile definitions to generate the display commands to render the graphical representation of the content at the user device 102. For instance, each tile may be associated with its own display command or set of commands for displaying the tile on the user device 102. The graphics processing module 152 instead of, or in addition to, the content processing module 150, may determine how to divide the content page into the set of tiles.

The script truncation module 154 may include any system that communicates with the graphics processing module 152 and/or the browser application 120 to determine a portion of one or more script libraries that are used to load a content page and that generates one or more hint files and/or one or more truncated script libraries based on the determination. For example, the graphics processing module 152, when rendering the graphical representation of the content, may determine what portion of a script library is used during the rendering process and provide this determination to the script truncation module 154. Alternatively, the user device 102 may render the content page, and thus the browser application 120 may determine what portion of the script library is used during the rendering process and transmit this determination to the script truncation module 154. Based on the received determination, the script truncation module 154 can perform one of two functions. The script truncation module 154 can generate a truncated script library that only includes the portions of the script library that are used to load the content page and generate a hint file that references a stored location of the generated truncated script library. Alternatively, the script truncation module 154 can generate a hint file that includes compilation hints for compiling the script library, where the compilation hints are based on the portions of the script library that are used to load the content page (e.g., the compilation hints may include instructions for compiling the script library in a manner that takes advantage of the portions of the script library that are used to load the content page and/or that ignores the portions of the script library that are not used to load the content page). The hint file may be stored in the script hint file database 144 in an entry associated with an identity of the content page and/or the script library from which the hint file is derived.

In an embodiment, the content processing module 150 retrieves script libraries that are requested by the user device 102 (e.g., the browser application 120) or the graphics processing module 152 when rendering the page. Before retrieving the requested script library, the content processing module 150 may access the script hint file database 144 to determine whether a hint file exists that is associated with the appropriate content page and the script library that is requested. If a hint file exists, the content processing module 150 retrieves the hint file from the script hint file database 144. If the hint file references a location of a truncated script library, then the content processing module 150 retrieves the truncated script library instead of the script library and transmits the truncated script library to the entity requesting the script library (e.g., the user device 102 or the graphics processing module 152) so that the entity requesting the script library can render the page using the truncated script library. If the hint file includes compilation hints, then the content processing module 150 retrieves the script library and transmits the script library and the compilation hints to the entity requesting the script library so that the entity requesting the script library can compile the script library according to the compilation hints and render the page based on the compiled script library. Thus, the first time a content page is requested, the content processing module 150 may retrieve a requested script library. During or after the content page retrieval process, the script truncation module 154 may generate a hint file such that each subsequent time that a request for the content page is received, the content processing module 150 may retrieve the hint file and act accordingly to the contents of the hint file.

In some embodiments, a portion of a script library not included in the truncated script library referenced by the hint file or not referenced by the compilation hints in the hint file may be needed to load the content page. For example, the hint file may be based on a first user device 102 that used a first feature. However, a second user device 102 may attempt to use a second feature not used by the first user device 102, and thus the hint file may not reference a location of a truncated script library that includes the portion of the script library used to enable the second feature or may not include compilation hints that are based on the portion of the script library used to enable the second feature. Thus, the content processing module 150 may retrieve the needed portion of the script library or the entire script library itself and provide such data to either the user device 102 or the graphics processing module 152. Alternatively, the content processing module 150 may retrieve the needed portion of the script library or the entire script library itself and provide such data to the script truncation module 154. The script truncation module 154 may then retrieve the original hint file from the script hint file database 144. If the original hint file includes a reference to a location of a truncated script library, then the script truncation module 154 retrieves the truncated script library and updates it to include the needed portion of the script library. If the original hint file includes compilation hints, then the script truncation module 154 updates the compilation hints based on the needed portion of the script library. The script truncation module 154 then transmits the updated script library to the user device 102 or the graphics processing module 152.

The script truncation module 154 can optimize the hint file and/or use multiple hint files for the same script library and/or content page (e.g., if bandwidth is limited). For example, a first hint file can reference a location of a truncated script library that includes the portion of the script library associated with above the fold assets (e.g., the portion of the script library used to enable features that will first be displayed in the browser application 120 before the user associated with the user device 102 interacts with the content page) or can include compilation hints that are based on the portion of the script library associated with above the fold assets. The script truncation module 154 may generate just the first hint file or may generate a second (and/or third, fourth, etc.) hint file that references a location of a truncated script library that includes the portion of the library associated with below the fold assets (e.g., the portion of the script library used to enable features that will not be displayed in the browser application 120 before the user associated with the user device 102 interacts with the content page) or that includes compilation hints that are based on the portion of the library associated with below the fold assets. The script truncation module 154 and/or the content processing module 150 may transmit the first hint file and then any subsequent hint files based on bandwidth availability and/or whether the features below the fold are being accessed by the user.

In some embodiments, the script truncation module 154 generates the hint file based on a plurality of requests for the content page. For example, multiple user devices 102 may request the same content page. The script truncation module 154 may monitor the behavior of each user device 102 and determine the portions of a script library used by each user device 102 (e.g., via information provided by the user devices 102 or the graphics processing module 152). In some cases, the user devices 102 may use different parts of a script library. Thus, the script truncation module 154 can generate a hint file by aggregating the information obtained from the plurality of requests for the content page (e.g., the hint file can reference a location of a truncated script library that includes all portions of the script library that are used by at least one user device 102, the hint file can include compilation hints that are based on all portions of the script library that are used by at least one user device 102, the hint file can reference a location of a truncated script library that includes the portions of the script library that are used most often by the user devices 102, the hint file can include compilation hints that are based on the portions of the script library that are used most often by the user devices 102, the hint file can reference a location of a truncated script library that includes the portions of the script library that are used by each user device 102, the hint file can include compilation hints that are based on the portions of the library that are used by each user device 102, etc.).

In further embodiments, the script truncation module 154 associates a generated hint file with groups of user devices 102 in addition to associating the generated hint file with the script library and the content page. For example, a group of user devices 102 may have a common software and/or hardware configuration. In general, the script truncation module 154 can optimize the hint files for different combinations of software and/or hardware configurations. Thus, the content processing module 150 may retrieve a hint file if a hint file exists that is associated with the same or similar (e.g., compatible) software and/or hardware configuration as the user device 102 that requested the content page. In addition, the content processing module 150 can determine whether to perform script compilation and/or render the page or whether script compilation and/or page rendering should occur on the user device 102 based on the software and/or hardware configuration of the user device 102. For example, if the user device 102 has a CPU at a first speed, the intermediary system 104 may perform the compilation and rendering, whereas if the user device 102 has a CPU at a second speed that is faster than the first speed, then the user device 102 may be directed to perform the compilation and rendering. Other factors that may determine which device performs the operations may include memory size, content retrieval speeds (e.g., the longer it takes the user device 102 to retrieve content, the more likely the intermediary system 104 will perform the rendering, etc.), and/or the like.

In further embodiments, the script truncation module 154 associates a generated hint file with individual user devices 102 in addition to associating the generated hint file with the script library and the content page. For example, users of different user devices 102 may access the same content page differently. One user may only access the functionality associated with one script, a second user may access the functionality associated with all scripts, and a third user may not access any functionality associated with scripts. Thus, the hint file can be tailored to individual user devices 102 and include a reference to a location of a truncated script library that includes the portions of the script library used by the respective user device 102 or include compilation hints that are based on the portions of the script library used by the respective user device 102. As another example, a content page may include functionality provided by multiple script libraries or multiple features that use different portions of a script library, and a user may access the functionality on the content page in a certain order each time or most times the content page is requested. If bandwidth is an issue, the hint file can include a reference to a location of a truncated script library that includes the code for the script libraries or the portions of the script library that are expected to be accessed first or can include compilation hints that are based on the code for the script libraries or the portions of the script library that are expected to be accessed first.

The hint files may become stale after a period of time. For example, the script truncation module 154 may set an attribute for a hint file such that the hint file is only valid for a period of time. After the validity period expires, the script truncation module 154 can remove the hint file from the script hint file database 144, causing the original library to be retrieved when a request for the content page associated with the removed hint file is made. The script truncation module 154 may then generate a new hint file based on the new request for the content page. Setting a validity period may ensure that the data included in the hint file does not become stale as content pages are updated and/or user behavior changes.

The intermediary system 104 may include additional modules, components, data stores, and the like to provide the features described above and in greater detail below. For example, the intermediary system 104 may include a cache 142 that stores content items received form content sources 106 and 108, a DOM representation of a page (e.g., rendered pages), graphics commands generated by the headless browser 140, and/or the like. Information may be stored in the cache 142 when content is retrieved from the content sources 106 and 108. The cache 142 may also dynamically update as new content is retrieved from the content sources 106 and 108. For example, to render a page, the headless browser 140 may parse the code of the page (e.g., HTML, XHTML, XML, JavaScript, etc.) into a DOM representation (e.g., a DOM tree). As described above, each node of the DOM representation represents an element to be displayed in the page (e.g., a tag, such as an HTML tag, that indicates tables, links, images, videos, etc.). The DOM representation can be stored in the cache 142 (e.g., as synchronized copy of the rendered page).

The intermediary system 104 may also include a script hint file database 144 that stores hint files and an indication of the script library, the content page, and/or the user device 102 with which a hint file is associated. The script hint file database 144 may also store truncated script libraries. While the script hint file database 144 is illustrated as being internal to the intermediary system 104, this is not meant to be limiting. The script hint file database 144 may be a data store that is external to the intermediary system 104 (e.g., a separate data store hosted by a separate device, a data store associated with a user device 102, etc.).

While the intermediary system 104 is described herein as including a headless browser 140, this is not meant to be limiting. For example, the intermediary system 104 may include a remote execution server that includes components similar to the components of the headless browser 140. The remote execution server may generate hint files in the same manner as the headless browser 140; however, the remote execution server may generate the hint files for any application that compiles code or requests the compilation of code to generate an interface or perform a function. The remote execution server may identify the portions of a library used when compilation of the code occurs, generate a hint file that references a location of a file that includes just those portions (e.g., in the cache 142) or that provides compilation hints that can be used to compile the library in a more efficient or optimal manner, and use the hint file rather than the original library when a request to compile the code is received in the future.

Although in the examples described herein the intermediary system 104 is configured to communicate between the origin content servers 106 and CDN servers 108 and user devices 102 to generate hint files and to provide representations of a page that can be rendered or displayed to the user devices 102, in some embodiments the origin content servers 106 and/or CDN servers 108 can be configured to generate the hint files and/or generate representations of content pages and send such data directly to a user device. For example, the capability to generate hint files and/or send representations of a page to the user devices 102 can be provided to origin content servers 106 and CDN servers 108 in the form of an add-in or extension. The origin content servers 106 or CDN servers 108 can, in some embodiments, assess whether these hint file generation and rendering techniques should be used for a given page request based on factors such as whether the techniques would result in reduced user-perceived page load time, processor usage, or battery usage, among other things, relative to at least one alternative rendering technique. In some cases, the content servers 106 or CDN servers 108 can determine whether these rendering technique are optimal for a given page load based on a number of factors, for example the speed, bandwidth, latency, and type of network connection with user device as well as characteristics of the content site and whether this feature is supported by the user device 102. Accordingly, any of the hint file generation and rendering actions described herein as being performed by the intermediary system 104 can, in some embodiments, be performed additionally or exclusively by the origin content servers 106 and/or CDN servers 108, in which case the intermediary system 104 may be omitted.

The intermediary system 104 may be a single computing device, or it may include multiple distinct computing devices, such as computer servers, logically or physically grouped together to collectively operate as a server system. The components of the intermediary system 104 can each be implemented in application-specific hardware (e.g., a server computing device with one or more ASICs) such that no software is necessary, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Example Process for Replacing a Damaged Portion of a Network Page

Figure 2:
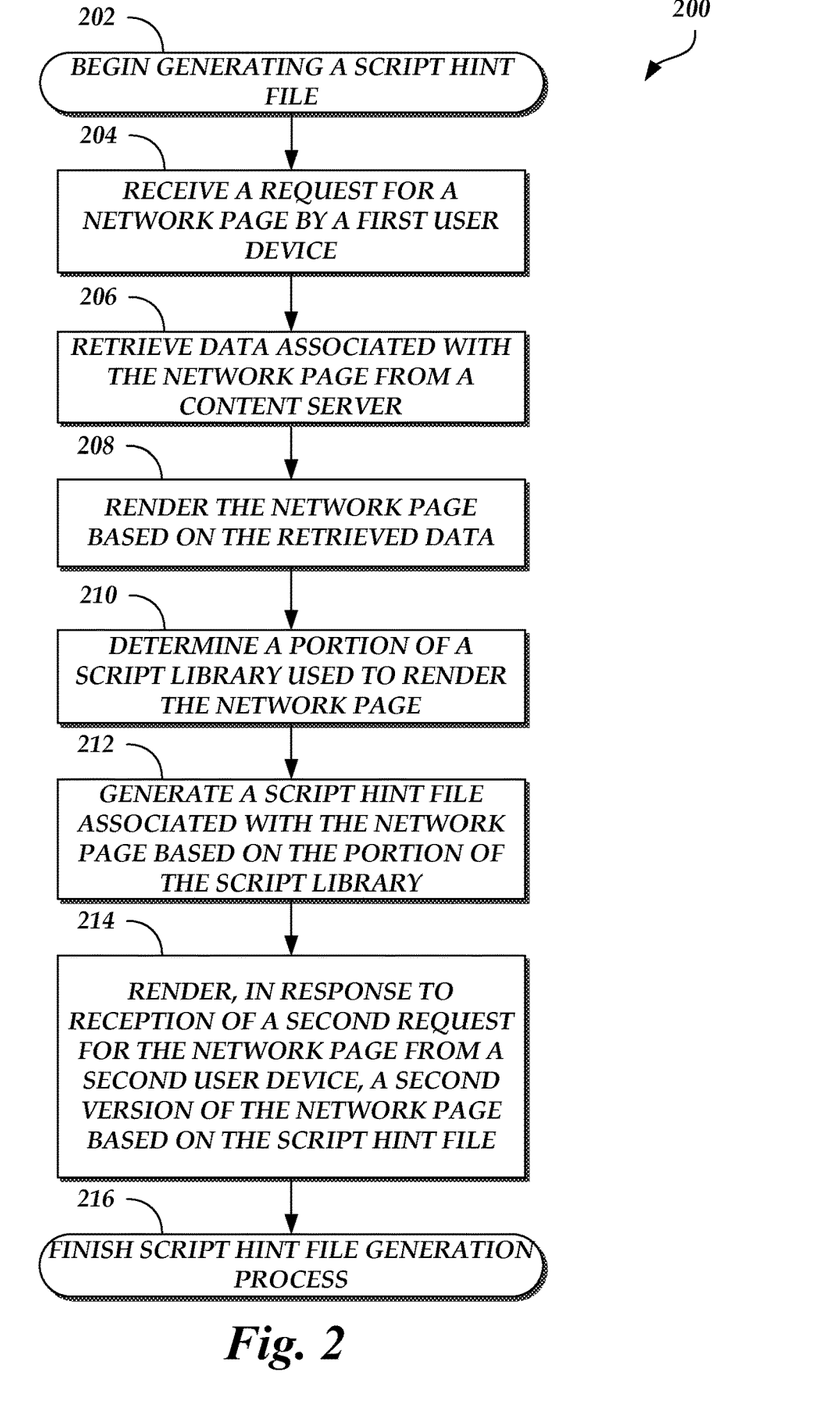
FIG. 2 illustrates a script hint file generation process that may be used by an intermediary system to provide a user device with a rendered network page in a reduced amount of time.

FIG. 2 illustrates a script hint file generation process 200 that may be used by an intermediary system to provide a user device with a rendered network page in a reduced amount of time. As an example, the intermediary system 104 (e.g., the headless browser 140) of FIG. 1 can be configured to execute the script hint file generation process 200. The script hint file generation process 200 begins at block 202.

At block 204, a request for a network page by a first user device is received. For example, the request may be received over a network, such as the network 110. The request may be received when a user attempts to the access the network page via a browser application running on the first user device.

At block 206, data associated with the network page is retrieved from a content server. For example, the data may include the code of the network page (e.g., an HTML file). The code may include a script that requests code from an additional file, such as a script library, when the script is executed.

At block 208, the network page is rendered based on the retrieved data. As an example, during the rendering process, the script may be executed and a script library may be retrieved.

At block 210, a portion of the script library that is used to render the network page is determined. For example, the script library may include a block of code. However, the data associated with the network page may only reference a portion of the block of code and may be rendered without the remaining unreferenced portion.

At block 212, a script hint file associated with the network page is generated based on the portion of the script library. The script hint file may include a reference to a location of a truncated script library that includes the portion of the script library that is used to render the network page. In an embodiment, the truncated script library has a smaller file size than the original script library because the truncated script library file only includes a portion of the code that is found in the script library. Alternatively, the script hint file may include compilation hints for compiling the script library in a more optimal or efficient manner that are based on the portion of the script library that is used to render the network page.

At block 214, in response to reception of a second request for the network page from a second user device, a second version of the network page is rendered based on the script hint file. For example, when the script embedded in the code of the network page is encountered and executed, an instruction may be generated that requests the script library. However, instead of requesting the script library, the intermediary system 104 may instead retrieve the script hint file. If the script hint file references the location of the truncated script library, the truncated script library may be retrieved and used to render the second version of the network page. If the script hint file includes compilation hints, the script library may be retrieved and compiled accordingly to the compilation hints and used to render the second version of the network page. After the second version of the network page is rendered, the script hint file generation process 200 may be complete, as shown in block 216.

Example Process for Using a Script Hint File to Render a Page

Figure 3:
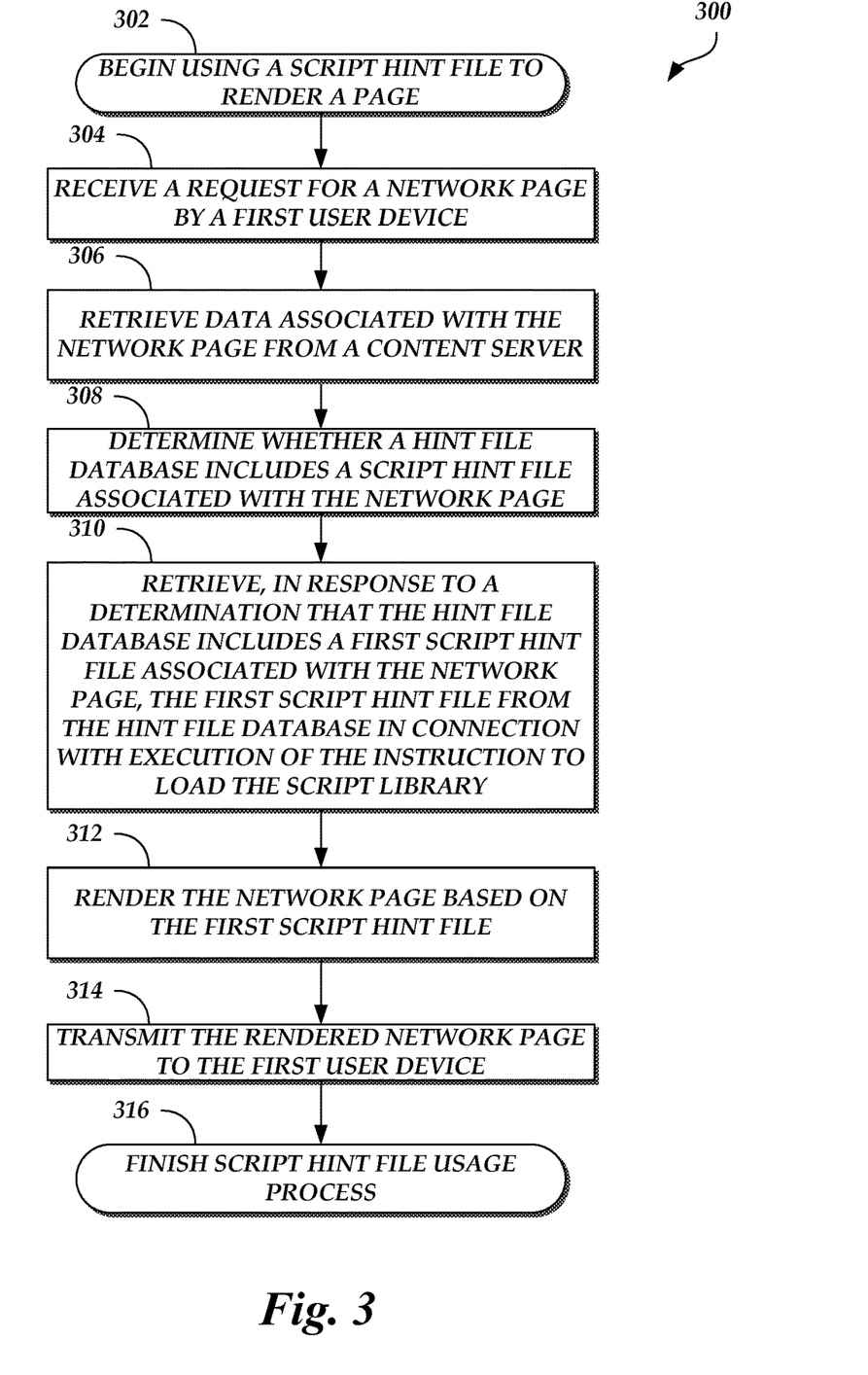
FIG. 3 illustrates a script hint file usage process that may be used by an intermediary system to provide a user device with a rendered network page in a reduced amount of time.

FIG. 3 illustrates a script hint file usage process 300 that may be used by an intermediary system to provide a user device with a rendered network page in a reduced amount of time. As an example, the intermediary system 104 (e.g., the headless browser 140) of FIG. 1 can be configured to execute the script hint file usage process 300. The script hint file usage process 300 begins at block 302.

At block 304, a request for a network page by a first user device is received. The request may be received after another user device has already requested the same network page at a previous time.

At block 306, data associated with the network page is retrieved from a content server. For example, the data may include the code of the network page (e.g., an HTML file). The code may include a script that requests code from an additional file, such as a script library, when the script is executed.

At block 308, whether a hint file database includes a script hint file associated with the network page is determined. For example, because the same network page was requested at a previous time, the intermediary system 104 may have generated a hint file based on the prior request and stored the hint file in the hint file database.

At block 310, in response to a determination that the hint file database includes a first script hint file associated with the network page, the first script hint file is retrieved from the hint file database in connection with execution of the instruction to load the script library. The first script hint file may be retrieved before a possible retrieval of the script library.

At block 312, the network page is rendered based on the first script hint file. For example, the first script hint file may include a reference to a location of a truncated script library. The truncated script library may be retrieved and used to render the network page. As another example, the first script hint file may include compilation hints for compiling the script library in a more optimal or efficient manner. The script library may be retrieved, compiled according to the compilation hints, and used to render the network page.

At block 314, the rendered network page is transmitted to the first user device. In an embodiment, the first user device then displays the rendered network page in a browser application. After the rendered network page is transmitted, the script hint file usage process 300 may be complete, as shown in block 316.

Example Network Page Viewed on a User Device

Figure 4A:
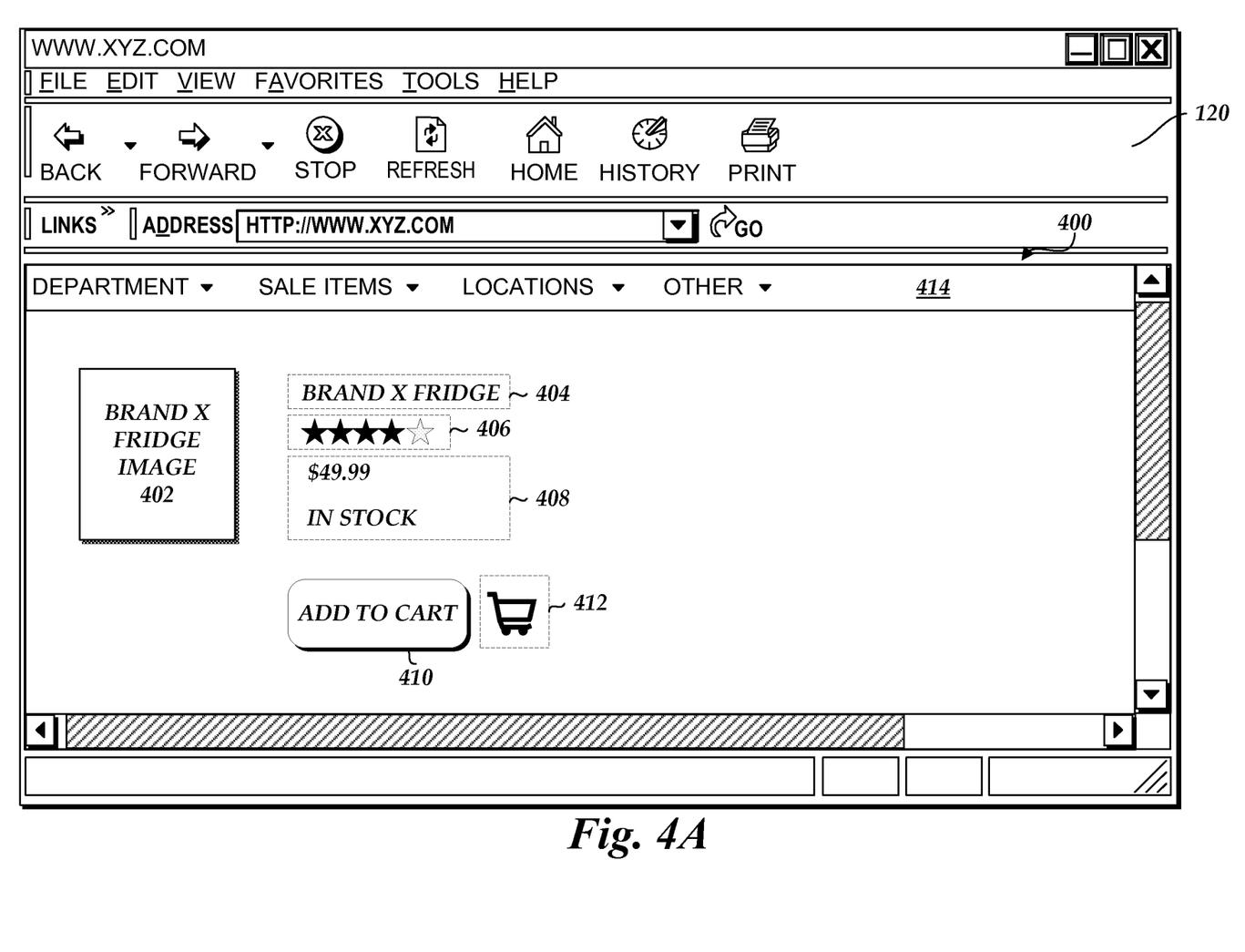
FIGS. 4A-B illustrate an example of a representation of a network page viewed on a user device, such as the user device of FIG. 1.
Figure 4B:
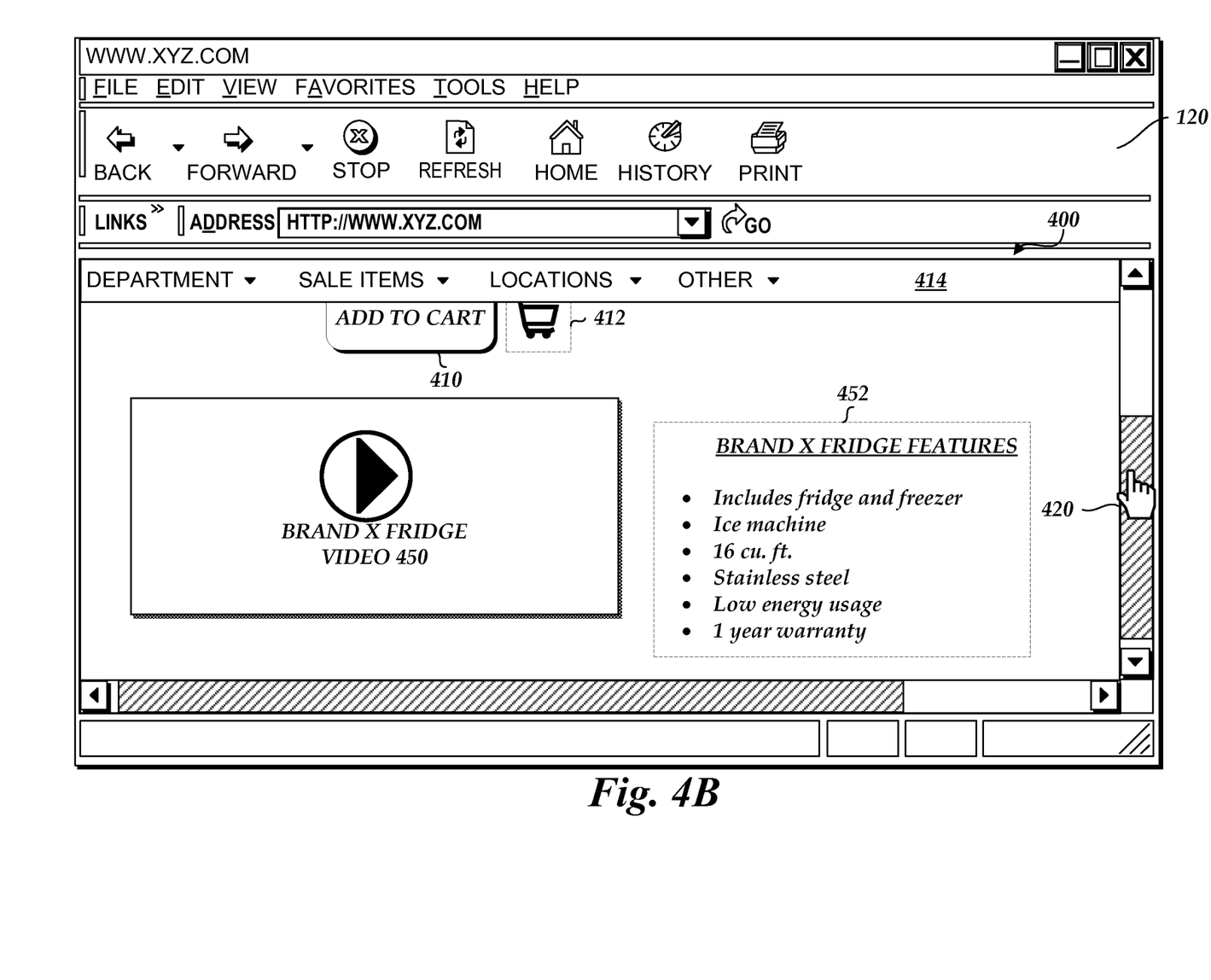

FIGS. 4A-B illustrate an example of a representation of a network page 400 viewed on a user device, such as the user device 102. The network page 400 may be displayed within the user interface of the browser application 120 of the user device 102. As illustrated in FIG. 4A, the network page 400 includes content, such as image 402, text 404, image 406, text 408, button 410, and image 412. Furthermore, the network page 400 includes a menu bar 414 that may be created using a script (e.g., JavaScript or CSS).

In an embodiment, the code of the network page 400 that is executed to generate the menu bar 414 may, when executed, request code from a script library. The first time the network page 400 is requested, the intermediary system 104 may request the script library. In addition, the intermediary system 104 may perform one of two operations. For example, the intermediary system 104 may generate a truncated script library that includes a portion of the script library that is actually used to render the menu bar 414, store the generated truncated script library, and generate a hint file that references a location of the stored truncated script library. Alternatively, the intermediary system 104 may generate a hint file that includes compilation hints for compiling the script library based on the portion of the script library that is actually used to render the menu bar 414. The hint file may be stored in an entry associated with the network page 400 for later use (e.g., when the network page 400 is requested again by the same user device 102 or other user devices 102 in the future).

In some embodiments, the network page 400 includes other content generated by scripts that is not visible when the network page 400 is first displayed. For example, the network page 400 may include below the fold content generated by scripts. If bandwidth is limited, the intermediary system 104 may not generate the hint file based on the portions of script libraries used to generate the below the fold content. Rather, the intermediary system 104 may generate an additional hint file that is based on the portions of script libraries used to generate below the fold content or may request the script libraries if below the fold content becomes above the fold content (e.g., the user scrolls down the network page 400).

As illustrated in FIG. 4B, a user, using a mouse or a touch interface, may scroll down the network page 400, as indicated by mouse icon 420. The network page 400 now includes further content: video 450 and text 452. In some embodiments, the video 450 may be generated by a script and additional script libraries not already requested by other content in network page 400 may be needed to display the video 450 and/or other portions of a script library not yet used may be needed to display the video 450. If bandwidth is not limited, the intermediary system 104 may have generated the hint file based on the portions of the script libraries needed to display the video 450. If bandwidth is limited, the intermediary system 104 may not have generated the hint file based on these portions. Thus, the intermediary system 104 may request the additional script libraries and provide the additional script libraries to the user device 102, use the additional script libraries to render the network page 400, update the compilation hints in the hint file (and use the updated compilation hints to compile the script library and render the network page 400), and/or update the truncated script library to include the additional portions (and the updated truncated script library can be used to render the network page 400).

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of using a truncated script library for rendering a network page, the method comprising:

as implemented by a computer system comprising one or more computing devices, the computer system configured with specific executable instructions, receiving a first request for a network page submitted by a first user device;

in response to the first request, retrieving data associated with the network page from a content server that hosts the network page;

rendering the network page based on the retrieved data, wherein the rendering comprises loading a script and retrieving a library associated with the script;

determining a portion of the library used to render the network page;

generating, and storing for subsequent use, a truncated library that includes the determined portion of the library used to render the network page and that excludes a portion of the library not used to render the network page, the truncated library corresponding to the network page and being generated in response to said rendering of the network page;

generating a script hint file for the network page, wherein the script hint file references the truncated library;

storing the script hint file in a hint file database in an entry associated with an identifier of the network page;

subsequently, receiving a second request for the network page submitted by a second user device, and in response to the second request;

retrieving the data associated with the network page from the content server;

determining that the hint file database includes the hint file for the network page;

loading the script;

retrieving the script hint file; and by an intermediary system that operates as an intermediary between the second user device and the content server, rendering the network page based on the retrieved data and the truncated library referenced by the script hint file and transmitting the rendered network page to the second user device.

2. The computer-implemented method of claim 1, wherein determining a portion of the library used to render the network page comprises determining a portion of the library used to render a portion of the network page that is visible to a user associated with the first user device when the rendered network page is first displayed by the first user device.

3. The computer-implemented method of claim 2, wherein the script hint file is generated based on the portion of the library used to render the portion of the network page that is visible to the user associated with the first user device, and wherein the script hint file is not generated based on portions of the library that are not used to render the portion of the network page that is visible to the user associated with the first user device.

4. The computer-implemented method of claim 1, wherein the script hint file is further associated with a first type of hardware, and wherein hardware compatible with the first type of hardware is comprised within the first user device.

5. The computer-implemented method of claim 4, further comprising:
   determining that hardware compatible with the first type of hardware is comprised within the second user device;
   in response to the determination that the hint file database includes a hint file for the network page and that the hardware compatible with the first type of hardware is comprised within the second user device, rendering the network page based on the retrieved data; and
   transmitting the rendered network page to the second user device.

6. The computer-implemented method of claim 1, wherein the computer system operates as an intermediary between user devices and content servers.

7. The computer-implemented method of claim 1, wherein the script is cascading style sheets (CSS).

8. A system comprising:
   a computer data repository that stores hint files, the computer data repository comprising a storage device; and
   a computing system comprising one or more computing devices including a processor and memory, wherein instructions stored in the memory, when executed, cause the computing system to:
      process a first request for a network page submitted by a first user device;
      in response to the first request, retrieve data associated with the network page from a content server that hosts the network page;
      transmit the retrieved data to the first user device;
      receive, from the first user device, a request for a script library to render the network page;
      retrieve and transmit the script library to the first user device;
      receive, from the first user device, an indication of a portion of the script library that is used to render the network page;
      generate, and store for subsequent use, a truncated library that includes the portion of the script library that is used to render the network page and that excludes a portion of the script library not used to render the network page, the truncated library corresponding to the network page and being generated in response to said rendering of the network page by the first user device;
      generate a script hint file for the network page, wherein the script hint file references the truncated library;
      store the script hint file in association with an identifier of the network page;
      subsequently, receive a second request for the network page from a second user device; and
      determine, in response to the second request, whether a script hint file exists for the network page; and
      in response to determining that the script hint file exists for the network page, use the script hint file to cause the truncated library to be used to render the network page, wherein using the script hint file to cause the truncated library to be used to render the network page comprises, by an intermediary system that operates as an intermediary between the second user device and the content server, rendering the network page using the truncated library and sending the rendered network page to the second user device.

9. The system of claim 8, wherein the instructions, when executed, further cause the computing system to receive, from the first user device, an indication of a portion of the library used to render a portion of the network page that is visible to a user associated with the first user device when the rendered network page is first displayed by the first user device.

10. The system of claim 9, wherein the script hint file is generated based on the portion of the library used to render the portion of the network page that is visible to the user associated with the first user device, and wherein the script hint file is not generated based on portions of the library that are not used to render the portion of the network page that is visible to the user associated with the first user device.

11. The system of claim 8, wherein the instructions, when executed, further cause the computing system to:
   determine a type of hardware comprised within the first user device; and
   associate the script hint file with hardware compatible with the type of hardware.

12. The system of claim 11, wherein the instructions, when executed, further cause the computing system to, in response to receiving the second request for the network page and in response to determining that the second user device comprises hardware compatible with the type of hardware, transmit the script hint file to the second user device.

13. The system of claim 8, wherein the instructions, when executed, further cause the computing system to store the script hint file in the computer data repository in an entry associated with the network page.

14. The system of claim 13, wherein the instructions, when executed, further cause the computing system to access the computer data repository to determine whether to transmit the script hint file to the second user device.

15. The system of claim 8, wherein the computer system operates as an intermediary between user devices and content servers.

16. The system of claim 8, wherein the script library is a library for cascading style sheets (CSS).

17. The system of claim 8, wherein the script hint file comprises compilation hints for compiling the script library, and wherein the compilation hints are based on the portion of the script library that is used to render the network page.

18. A computer process for reducing unnecessary loading of portions of script libraries, the method comprising, by execution of program code by one or more processors:
   rendering a content page, wherein rendering the content page comprises loading a script library, and executing only a portion of the script library, wherein a second portion of the loaded script library is not used to render the content page;
   generating, for the content page, based solely on said rendering of the content page, a file specifying the executed portion of the script library;
   storing the file in association with an identifier of the content page;

subsequently, receiving a request for the content page from a requesting device; and in response to the request, retrieving the file, and using the file to cause the content page to be rendered without loading the second portion of the script library;

wherein using the file to cause the content page to be rendered without loading the second portion comprises, by an intermediary system that operates as an intermediary between the requesting device and a content server that hosts the content page, rendering the content page using the truncated version of the script library, and sending the rendered content page to the requesting device.

19. The computer process of claim 18, wherein the file includes a reference to a truncated version of the script library, the truncated version excluding the second portion of the script library, the truncated version generated prior to receiving the request.

* * * * *